UNITED STATES PATENT OFFICE.

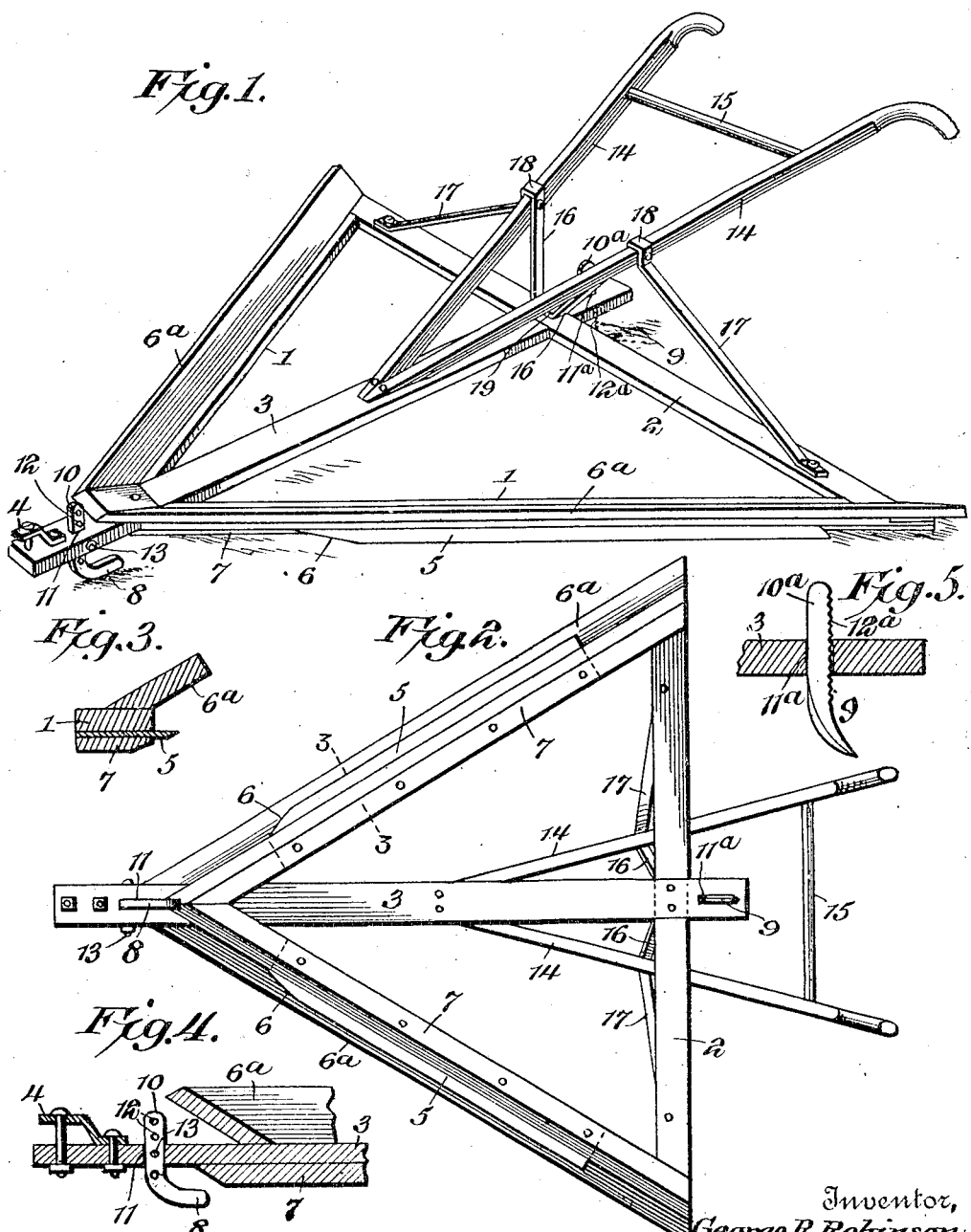

GEORGE R. ROBINSON, OF BIENVILLE, LOUISIANA.

COTTON AND CORN STALK CUTTER.

No. 852,349.   Specification of Letters Patent.   Patented April 30, 1907.

Application filed July 10, 1906. Serial No. 325,520.

*To all whom it may concern:*

Be it known that I, GEORGE R. ROBINSON, a citizen of the United States, residing at Bienville, in the parish of Bienville and State of Louisiana, have invented a new and useful Cotton and Corn Stalk Cutter, of which the following is a specification.

The invention relates to improvements in stalk cutters.

The object of the present invention is to improve the construction of stalk cutters, and to provide a simple, inexpensive and efficient stalk cutter, designed for cutting the stalks of a crop of cotton or corn in preparing the land for another crop, and capable of bending or flexing the stalks before the knives or blades come in contact with the same, whereby the stalks are more rapidly and effectively severed from the ground and thrown outwardly from the stalk cutter.

A further object of the invention is to provide a stalk-cutter adapted to be readily drawn by one horse, and capable of cutting two rows of stalks, and of depositing the severed stalks in every second row and of leaving the intermediate row, in which the cutter operates, clear of stalks, thereby enabling the stalks to be raked, or otherwise removed, in about one half the time that is required for their removal, when the rows are cut down one at a time.

Another object of the invention is to provide a stalk cutter having means adjustable to suit the character of the land for preventing the cutter from being thrown from one side to the other.

With these and other objects in view, the invention consists in the construction and novel combination of parts hereinafter fully described, illustrated in the accompanying drawing, and pointed out in the claims hereto appended.

In the drawing:—Figure 1 is a perspective view of a stalk cutter, constructed in accordance with this invention. Fig. 2 is a reverse plan view of the same. Fig. 3 is a detail sectional view, taken substantially on the line 3—3 of Fig. 2. Fig. 4 is a longitudinal sectional view of the front portion of the cutter, illustrating the manner of adjustably mounting the runners. Fig. 5 is a detail sectional view, illustrating the manner of adjustably mounting the colter.

Like numerals of reference designate corresponding parts in all the figures of the drawing.

The frame of the stalk cutter is triangular, and is provided with forwardly converging side bars 1, which are connected at their rear ends by a transverse bar 2, and which are secured at their front ends to a central longitudinal beam 3. The beam 3, which extends the entire length of the frame, projects at the front and back of the same and is suitably secured to the rear transverse bar 2, and it is provided at its front end with a suitable clevis 4 for the attachment of a draft animal.

The frame is provided at its sides with longitudinally disposed stalk cutting blades 5, which are arranged at the same angle as the sides of the frame, and which have tapered front portions 6. The blades, which project laterally from the outer side edges of the side bars 1, are secured to the lower faces of the said bars 1 and are firmly held in place by bottom bars or runners 7, which have beveled outer edges, and which are adapted to run upon the ground. The front ends of the runner bars fit against each other, and are secured to the lower face of the central beam, which is interposed between the front ends of the side bars 1.

The stalk cutter operates between two rows of stalks, and is adapted to cut each of the adjacent rows, and as the cutter is drawn forward, the angularly disposed blades are drawn along the edges of the stalks, and sever the same from the ground with a shear cut. In order to render the cutting operation more effective, the cutter is provided with superimposed inclined stalk flexing wings or members $6^a$, which bend the stalks outwardly before the knives come in contact with the same. These wings or members, which extend longitudinally of the sides of the triangular frame, are set at an angle, being inclined upwardly and outwardly. The knives or cutters terminate short of the front end of the frame, and the inclined sides or wings project laterally beyond the plane of the cutting edges of the knives or blades, so that the stalks will be positively flexed or bent before being cut. The wings or members are also adapted to throw the stalks outwardly away from the stalk cutter, and the stalks fall in every second row and lie in alternate rows when cut. This will enable the stalks to be raked up, or otherwise removed, in about half the length of time that is required to remove the stalks from the land, when the rows are cut one at a time.

The stalk cutter is provided at its front with an adjustable runner 8, having a depending rearwardly extending curved portion and provided with an upwardly extending shank 10. The shank 10 is arranged in a slot 11 of the central beam at a point in advance of the bottom bars or runners 7, and provided at intervals with perforations 12, which are adapted to receive a bolt 13, and the latter pierces the beam and secures the runner at the desired vertical adjustment.

In order to effectually prevent the stalk cutter from being thrown from one side to the other, it is provided at its rear with an adjustable colter 9, consisting of an upper portion or shank $10^a$, and a depending portion or blade. The depending portion or blade, which is slightly curved, is provided with a lower cutting edge and terminates in a point, whereby it is adapted to penetrate the soil. The shank $10^a$, which is arranged in a slot $11^a$ of the rear end of the central beam is provided at its rear edge with a plurality of notches $12^a$, adapted to engage the rear wall of the slot $11^a$, whereby the colter is secured in its adjustment. Any other suitable means, however, may be employed for adjustably securing the colter to the central beam. The colter, which is adapted to penetrate the soil, enables the stalk cutter to be accurately guided and prevents the same from slipping laterally. The colter is adjusted to suit the character of the land, the penetration being less in hard soil than when the ground is soft or loose.

The stalk cutter is provided with a pair of inclined handle bars 14, secured at their lower front ends to the central beam of the frame and connected near their rear ends by a transverse rung 15. The rear ends of the handle bars are shaped into handles similar to the handles of an ordinary plow, and the bars 14 are supported by central and outer inclined braces 16 and 17, which may be constructed of a single piece of rod metal, as clearly shown in Fig. 1 of the drawing. The central braces are secured at their lower ends to the rear transverse bar of the frame, and they extend upwardly therefrom, and are secured at their upper ends to the inner faces of the handle bars. The outer braces extend from the handle bars to the outer portions of the transverse bar. When the central and outer inclined braces are constructed of a single piece of metal, they are connected at their adjacent ends by bends 18, which form grips and which embrace the handle bars. The central braces are connected at their lower ends by a horizontal portion 19, which is arranged on the upper face of the transverse bar 2, and which is pierced by the fastening devices for securing the central braces to the same.

It will be seen that the stalk cutter, which is exceedingly simple and inexpensive in construction, is strong and durable and is adapted to be drawn by a single draft animal, and is capable of simultaneously cutting two rows of stalks, and of throwing the same outwardly from the machine, so that the stalks when cut, do not interfere with the progress of the machine, and lie in alternate rows to facilitate removal. Also it will be clear that these stalks are flexed or bent before the knives or cutters come in contact with them, whereby the operation of cutting is rendered more effective and complete. Furthermore it will be apparent that adjustable means are provided for preventing the stalk cutter from being thrown from side to side.

Having thus fully described my invention, what I claim as new and desire to secure by Letters Patent, is:—

1. A stalk cutter provided with side bars arranged at an angle to each other, cutters extending longitudinally of the side bars, and wings also disposed longitudinally of the side bars and projecting outwardly beyond the cutters throughout the entire length of the same and arranged to flex the stalks before the latter are severed by the cutters.

2. A stalk cutter provided with side bars arranged at an angle to each other, cutters secured to the lower faces of the side bars and extending longitudinally of the same, and rigid wings secured to the upper faces of the side bars and disposed longitudinally of the same and projecting outwardly beyond the cutters throughout the entire length of the latter to flex the stalks before the same are severed by the cutters.

3. A stalk cutter provided with side bars arranged at an angle to each other, cutters extending longitudinally of the side bars, and wings also disposed longitudinally of the side bars and projecting outwardly beyond the cutters throughout the entire length of the same, said wings being set at an angle to flex the stalks before the latter are severed by the cutters.

4. A stalk cutter comprising a frame composed of a central beam and forwardly converging side bars having means for flexing the stalks, secured at their front ends to the beam at opposite sides thereof, a rear transverse bar connecting the side bars with each other and with the beam, and runner bars secured at the lower faces of the side bars and extended at their front ends beneath the beam, and cutting means carried by the frame.

5. A stalk cutter comprising a frame, cutting members carried by the frame, handle bars mounted on the frame, and inner and outer inclined braces constructed of a single piece of metal and secured to the frame and to the handle bars, the said braces being connected at their upper ends by bends forming grips for embracing the handle bars.

6. A stalk cutter comprising a tapering frame provided at opposite sides with cutters, an adjustable runner supporting the front of the frame, and an adjustable colter arranged at the back of the frame to penetrate the soil for holding the stalk cutter against lateral movement.

7. A stalk cutter comprising a frame composed of a central longitudinal beam, forwardly converging side bars connected at their front ends to the beam, and a rear transverse connecting bar secured to the side bars and to the longitudinal bar, cutters mounted on the side bars, a runner depending from the front end of the longitudinal bar, and a colter connected with the rear end of the longitudinal bar and adapted to penetrate the soil to prevent lateral movement of the stalk cutter.

8. A stalk cutter comprising a triangular frame provided at opposite sides with cutters, a runner supporting the front of the frame, a colter arranged at the back of the frame to penetrate the soil for holding the stalk cutter against lateral movement, said runner and cutter being arranged in a line with each other midway between the cutters.

9. A stalk cutter comprising a triangular frame provided at opposite sides with cutters, a runner supporting the front of the frame and consisting of a vertical portion adjustably secured to the frame, and a rearwardly extending horizontal portion to trail on the ground, and a colter arranged at the back of the frame to penetrate the soil for holding the stalk cutter against lateral movement.

10. A stalk cutter comprising a triangular frame provided at opposite sides with cutters, a runner supporting the front of the frame, and a colter arranged at the back of the frame to penetrate the soil for holding the stalk cutter against lateral movement, said cutter consisting of a vertical shank adjustably secured to the frame, and a blade curved rearwardly and tapered to a point and provided with a front cutting edge.

In testimony, that I claim the foregoing as my own, I have hereto affixed my signature in the presence of two witnesses.

GEORGE R. ROBINSON.

Witnesses:
   J. P. CROWSON,
   W. J. MURPHY.